June 17, 1958      D. B. HERTZ      2,838,800
PLASTIC SHEET MATERIAL
Filed Dec. 18, 1953
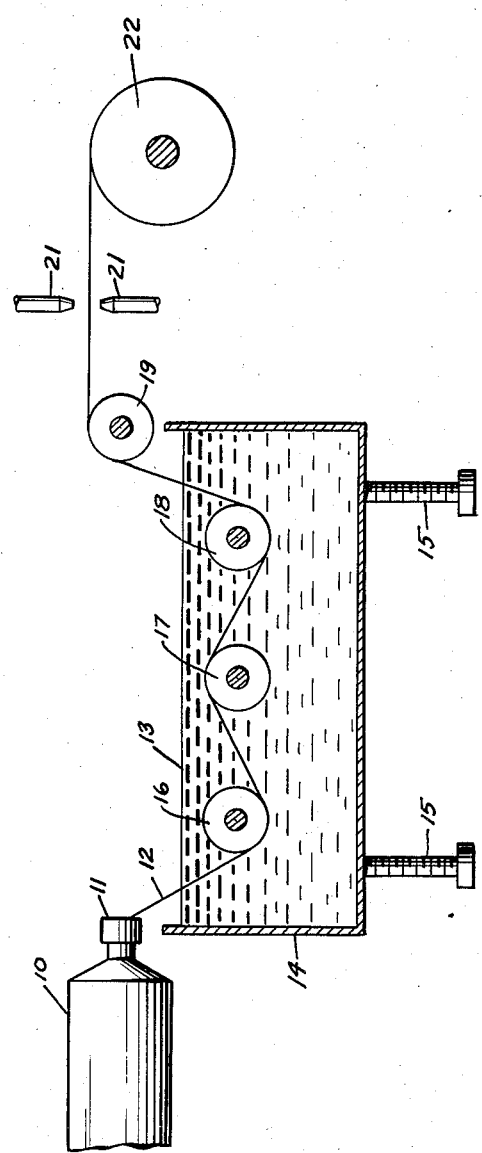
INVENTOR.
DAVID B. HERTZ
BY
ATTORNEYS

United States Patent Office 2,838,800
Patented June 17, 1958

2,838,800

PLASTIC SHEET MATERIAL

David B. Hertz, New York, N. Y., assignor to Celanese Corporation of America, New York, N. Y., a corporation of Delaware Application December 18, 1953, Serial No. 398,983

6 Claims. (Cl. 18—48)

Processes for the production of films and other sheet material from organic plastics are well known to those skilled in the art, who have employed such methods as extruding or rolling a heated thermoplastic material or casting solutions of the material onto rolls or belts. However, the prior processes have not proven satisfactory for the reason that sheet material produced thereby is generally not uniform in appearance, showing surface imperfections, gels and other irregularities. Although some improvement in the appearance of the sheet material has been obtained by subjecting said sheet material to smooth heated solid surfaces, which apply heat and pressure thereto, the results have not been completely satisfactory. For example, when the sheet material, before being subjected to heat and pressure, shows variations in gauge across its width, it has not been possible in the processes of the prior art to apply sufficient pressure to maintain the heated solid surfaces in contact with the surface of the sheet material at all times, so that the sheet material shows skip marks and other defects.

It is therefore an object of this invention to provide a novel, effective and economical process for improving the appearance and overall quality of organic plastic sheet material.

Other objects of this invention will be apparent from the following detailed description and claims.

According to this invention sheet material made of an organic plastic is subjected to pressure, and, desirably, to heat, by immersing said sheet material in a bath of molten metal. More particularly, in one embodiment of this invention, a continuous sheet of thermoplastic material is drawn under tension continuously around a plurality of rolls situated in a bath of molten metal, which bath is maintained at a temperature sufficiently elevated to soften said thermoplastic material.

The process of this invention may be applied to thermoplastic sheet materials of all types. Examples of suitable thermoplastic materials are organic derivatives of cellulose, such as cellulose esters and ethers, e. g. cellulose acetate, cellulose propionate, cellulose butyrate, cellulose acetate proprionate, cellulose acetate butyrate, ethyl cellulose or benzyl cellulose, polyamides such as polyhexamethylene adipamide or the polymer of caprolactam; polyurethanes such as the reaction product of tetramethylene diamine with the bis-chloroformate of butanediol-1,4; polyesters such as polyethylene terephthalate; and vinyl polymers such as polyvinyl chloride, copolymers of vinyl chloride and vinyl acetate, polystyrene or polyethylene. These thermoplastic materials may be formed into sheets in any desired manner, e. g. by extrusion, by rolling, or by casting of the material in molten or dissolved condition onto a surface such as a roll or belt.

The molten metal used in the process of this invention may be any of the heavy metals, including alloys, whose melting point is below the melting point of the thermoplastic sheet material. Thus, the metal may be mercury, lead, plumber's solder, tin, white metal (an alloy of lead, antimony and tin), bismuth amalgam, an eutectic alloy of tin, lead and cadmium, or germanium. Desirably there is employed a metal having a high surface tension in the molten state, e. g. mercury, in order to insure that the metal will have little or no tendency to adhere to the sheet material.

During its passage through the molten metal bath the sheet material should be immersed to a sufficient depth in said bath so that the molten metal will exert a considerable hydrostatic pressure (e. g. 1 atmosphere or more) on said sheet material. For example, when the metal is mercury, the sheet material is advantageously immersed to a depth of at least about three feet. Since the hydrostatic pressure of the molten metal is exerted equally in all directions, all portions of the surface of the sheet material will be subjected to equal pressures, regardless of variations in the gauge of the sheet material.

The temperature of the molten metal bath should be maintained at a point below the melting point of the sheet material but above the softening point of said material so as to permit deformation of the surface of the sheet material while still maintaining said material in sheet form. Thus, in one embodiment of this invention, wherein the sheet material is formed by extrusion and led directly from the extrusion die into the molten metal, best results are obtained when the temperature of the molten metal is maintained at or below the temperature of the sheet material emerging from the die. For example, when cellulose acetate is extruded at a temperature of about 400° F. the molten metal is desirably maintained at a temperature of about 375° F., but not below 325°. The molten metal bath may be maintained at the desired temperature in any suitable manner. Thus, the bath of molten metal may be contained in an insulated tank provided with a thermostatically controlled electric or gas heater.

As stated, in one embodiment of this invention the sheet material is drawn under tension around a plurality of rolls mounted in the molten metal bath. Desirably, the sheet material is threaded around these rolls in such a fashion that, due to the drawing tension, both of the surfaces of the sheet material are pressed against the surfaces of the rolls. The rolls may have smooth surfaces, in which case they act to polish the surfaces of the sheet material, or they may have embossed or roughened surfaces in order to produce any desired patterns on the surfaces of the sheet material. It is to be understood, of course, that, if desired, only one surface of the sheet material may be brought into contact with the surfaces of the rolls, or alternatively one surface of the sheet material may be brought into contact with a smooth roll while the other surface is brought into contact with an embossed roll. For best results the rolls are so mounted as to rotate freely in the bath. However, if desired, one or more of the rolls may be positively driven in order to produce special effects. The rolls may be mounted in the molten metal bath on one or more movable frames which may be raised or lowered within the bath. Thus, when the sheet is being threaded around the rolls the frame carrying the rolls may be raised to a height near, or above, the level of the surface of the bath to facilitate the threading operation, following which the frame is lowered to a point well below the level of the surface of the bath so as to make sure that the sheet will be subjected to the desired hydrostatic pressure in the bath. Alternatively, the tank for holding the bath may be provided with means, such as screw jacks, for raising and lowering said tank and rolls relative to the extrusion die or other source of sheet material.

One form of apparatus for carrying out this invention is illustrated in the accompanying drawing, which is a view in elevation with portions in cross-section. The drawing is described in detail in the following example, which is given to illustrate the invention further.

EXAMPLE

Cellulose acetate is passed through a heated extruder 10, of conventional construction, and emerges from the die 11 of said extruder at a temperature of 400° F. in the form of a continuous sheet 12, which sheet is passed downwardly into a bath 13 of mercury maintained at a temperature of 365° F. The bath 13 is contained in a tank 14 provided with screw jacks 15 for raising and lowering said tank. The sheet travels around smooth freely rotatable rolls 16, 17 and 18 mounted in the tank 14, the bottom surfaces of said rolls being 3½ feet below the surface of the bath 13, and then leaves said bath, passing over a freely rotatable guide roll 19 and then between jets of a cooling medium, such as air, supplied from nozzles 21. The sheet, which is now at a temperature of about 190° F. is wound up around a driven roll 22. The residence time of the sheet in the bath is ½ minute. The sheet is smooth and substantially free from surface imperfections, gels and other irregularities.

It is to be understood that the foregoing detailed description is given merely by way of illustration and that many variations may be made therein without departing from the spirit of my invention.

Having described my invention what I desire to secure from Letters Patent is:

1. Process for the treatment of sheet material which comprises drawing an organic thermoplastic sheet material through a heated bath of molten heavy metal having substantially no tendency to adhere to said sheet material, said bath being maintained at a temperature below the melting point but above the softening point of said material to effect an improvement in the appearance of said sheet material, said sheet being drawn through said heated bath of metal at a point sufficiently below the surface of said metal to there provide a hydrostatic pressure of at least about 1 atmosphere on said sheet.

2. Process for the treatment of sheet material which comprises drawing an organic thermoplastic sheet material through a heated bath of molten heavy metal having substantially no tendency to adhere to said sheet material, said bath being maintained at a temperature below the melting point but above the softening point of said material and into engagement with a solid surface maintained below the surface of said bath to effect an improvement in the appearance of said sheet material, said sheet being drawn through said metal and into engagement with said solid surface at a point sufficiently below the surface of said metal to there provide a hydrostatic pressure of at least about 1 atmosphere on said sheet.

3. Process for the treatment of sheet material which comprises drawing an organic thermoplastic sheet material through a heated bath of molten heavy metal having substantially no tendency to adhere to said sheet material, said bath being maintained at a temperature below the melting point but above the softening point of said material and around a roller in said bath to effect an improvement in the appearance of said sheet material, said sheet being drawn through said metal and around said roller at a point sufficiently below the surface of said metal to there provide a hydrostatic pressure of at least about 1 atmosphere on said sheet.

4. Process for the production of sheet material which comprises continuously extruding a heated organic thermoplastic material in sheet form and drawing the resulting heated extruded sheet material through a bath of molten heavy metal having substantially no tendency to adhere to said sheet material, said bath being maintained at an elevated temperature not above the temperature at which said sheet has been extruded and above the softening point of said sheet material to effect an improvement in the appearance of said sheet material, said sheet being drawn through said metal bath and into engagement with a solid surface maintained below the surface of said bath at a point sufficiently below the surface of said metal bath to there provide a hydrostatic pressure of at least about 1 atmosphere on said sheet.

5. Process for the production of sheet material which comprises continuously extruding a heated organic thermoplastic material in sheet form and drawing the resulting heated extruded sheet material through a bath of molten heavy metal having substantially no tendency to adhere to said sheet material, said bath being maintained at an elevated temperature not above the temperature at which said sheet has been extruded and above the softening point of said sheet material and around a plurality of rollers in said bath to effect an improvement in the appearance of said sheet material, said sheet being drawn through said metal bath and around at least one of said rollers at a point sufficiently below the surface of said metal to there provide a hydrostatic pressure of at least about 1 atmosphere on said sheet.

6. Process for the production of sheet material, which comprises continuously extruding heated cellulose acetate in sheet form and drawing the resulting heated extruded sheet material through a bath of molten heavy metal having substantially no tendency to adhere to said sheet material, said bath being maintained at an elevated temperature not above the temperature at which said sheet has been extruded and above the softening point of said sheet material, and around a plurality of rollers in said bath to effect an improvement in the appearance of said sheet material, said sheet being drawn through said metal at a point sufficiently below the surface of said metal to there provide a hydrostatic pressure of at least about 1 atmosphere on said sheet material.

References Cited in the file of this patent

UNITED STATES PATENTS

| | | |
|---|---|---|
| 891,687 | Gratama | June 23, 1908 |
| 1,610,954 | Lamplongh | Dec. 14, 1926 |
| 2,176,153 | Semon | Oct. 17, 1939 |
| 2,239,780 | Fikentscher et al. | Apr. 29, 1941 |
| 2,333,143 | Bennett | Nov. 2, 1943 |
| 2,563,394 | Cadgene | Aug. 7, 1951 |